April 6, 1937.　　　F. D. KINNEY　　　2,076,432
OPHTHALMIC LENS
Filed Sept. 14, 1934
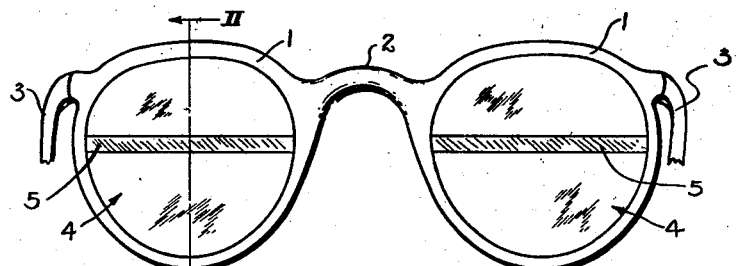
FIG. I
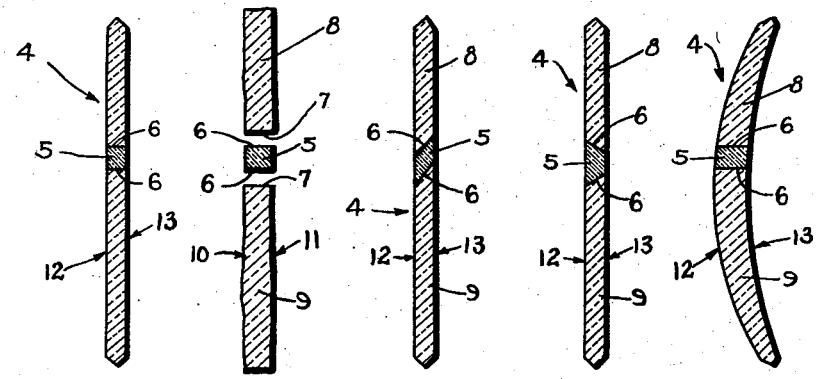
FIG. II　FIG. III　FIG. IV　FIG. V　FIG. VI
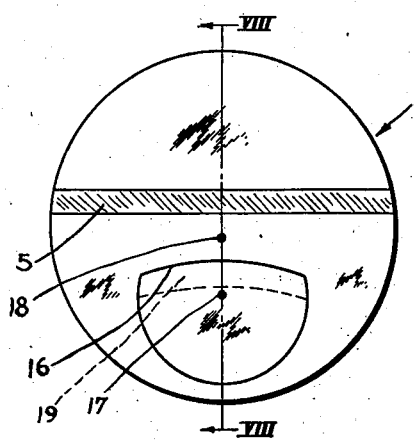
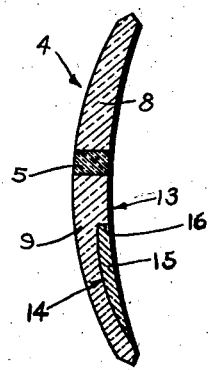
FIG. VII　FIG. VIII
INVENTOR
Fay D. Kinney
BY Harry H. Styll
ATTORNEY Patented Apr. 6, 1937

2,076,432

UNITED STATES PATENT OFFICE 2,076,432

OPHTHALMIC LENS

Fay D. Kinney, Southbridge, Mass., assignor to American Optical Company, Southbridge, Mass., a voluntary association of Massachusetts Application September 14, 1934, Serial No. 744,046

6 Claims. (Cl. 88—54)

This invention relates to improvements in ophthalmic mountings and has particular reference to an improved construction of mounting for reducing the glare of extreme light without impairing the general vision and has particular reference to the process of making the same.

One of the principal objects of the invention is to provide an improved construction of lens adapted to be placed before the eyes, a portion of which is of such a composition as to have the property of selective absorption or refraction as to certain of the rays of the visible, and if desired, a similar property in regard to the rays of the invisible spectrum, whereby only the proper and desired rays or rays in proper and desired proportions shall be admitted through the mounting to the eyes.

Another object is to provide a mounting adapted particularly for use in night driving and intended to reduce the glare from head lights without impairing the general vision of the road.

Another object is to provide a lens of the above character wherein the glare reducing or intercepting portion will have portions thereof varied as to their transparency or light absorbing or refracting nature.

Another object is to provide a lens of the above character embodying the required prescriptive corrections for the eyes of the wearer.

Another object is to provide a bifocal or multifocal lens having light reducing or intercepting means incorporated therein.

Other objects and advantages of the invention will become apparent from the following description taken in connection with the accompanying drawing, and it will be apparent that many changes may be made in the details of construction, arrangement of parts and steps of the process shown and described, without departing from the spirit of the invention as expressed in the accompanying claims. I, therefore, do not wish to be limited to the exact details or steps of the process shown and described as the preferred forms only have been shown by way of illustration.

Referring to the drawing:

Fig. I is a front elevation of an ophthalmic mounting embodying the invention;

Fig. II is a sectional view taken on line II—II of Fig. I and showing the rim of the mounting removed;

Fig. III is a diagrammatic view illustrating some of the steps of the process of manufacture;

Fig. IV is a view similar to Fig. II showing a modified form of the invention;

Fig. V is a view similar to Fig. IV showing another modified form of the invention;

Fig. VI is a sectional view showing the lens of Fig. II with prescriptive curves formed on the opposite faces thereof to produce the correction required by the wearer;

Fig. VII is a front elevation of a further modification;

Fig. VIII is a sectional view taken on lines VIII—VIII of Fig. VII.

Many attempts have been made in the past to provide means for reducing the glare from the head lights of automobiles during night driving. The most of the prior art devices were in the form of shields or colored transparent lenses or other means which greatly restricted or impaired the general vision of the road and thereby made it difficult to see the road even though the glare of the head lights was reduced.

One of the principal objects, therefore, of applicant's invention is to provide means for reducing the glare of head lights without impairing the general vision of the road and a simple and inexpensive process of making the same.

Referring more particularly to the drawing where like characters of reference designate like parts throughout the several views, the mounting embodying the invention, as shown in Fig. I, comprises the usual lens holding means 1 connected by a bridge member 2 and having temples or sides 3 for supporting the lenses 4 before the eyes of the wearer.

The lenses 4, as shown in Figures I, II and III, are formed by securing a bar of a lens medium 5 having glare reducing properties or the property of selective absorption or refraction of certain of the rays of the visible, and if desired, a similar property as regards the rays of the invisible spectrum, edge to edge along finished contacting surfaces 6 and 7 to separate clear portions of lens mediums 8 and 9. The portions 5, 8 and 9 are preferably united edge to edge by fusion, but it is to be understood that these various portions may be cemented together or held in engagement with each other by the supporting rims or other suitable means as desired. After the portions 5, 8 and 9 have been secured in edge to edge relation with each other the opposite surfaces 10 and 11 thereof are finished to smooth optical surfaces 12 and 13. These surfaces may be flat and parallel with each other, as shown in Fig. II, or may be spherical, cylindrical, toric or of any curve or combination of curves as desired, as shown in Fig. VI, it being understood that when the surfaces 12 and 13 are relatively flat and substantially parallel with each other there will be substantially no focal power through the lens. If formed with curved optical surfaces as shown in Fig. VI, the said lens will have a focal power controlled by the radius of the curvatures formed on the opposed surfaces of the lens. In instances wherein it is desired to form a single vision lens having the required prescriptive power for correcting the focal and other errors of the eye the indices of refraction of the various portions 5, 8 and 9 are preferably the same. It is apparent that if it is desired to vary the focal powers of the portions 8 and 9 the said portions may be formed of lens mediums having different indices of refraction. It is also apparent that the surface curvatures of the portions 8 and 9 do not necessarily have to be continuous as shown in the figures of the drawing. If desired the surfaces of the different portions may be provided with different curvatures, which in this instance would preferably be formed on said portions before they are secured in edge to edge relation with each other. In instances of this nature care is taken that during the fusing operation, or other methods used in securing the portions 5, 8 and 9 in edge to edge relation with each other, the finished optical surfaces 12 and 13 on said portions are not softened to a degree wherein they will run and become distorted or otherwise become injured.

The portion 5, as shown in Figures II and VI, is provided with substantially flat, parallel surfaces 6 which in the finished lens provide a relatively long transversely extending colored strip or portion of substantially the same intensity throughout its area.

In Fig. IV the edges 6 are formed on an angle relative to the optical axis of the lens so as to provide means whereby the intensity of the longitudinal edges of the portion 5 may be varied. It is apparent that the intensity will decrease with the outward taper of the angle of said edges thereby causing the longitudinal edges of the colored strip 5 to gradually become more transparent and substantially blend into the clear portions 8 and 9 along the contacting edges.

In Fig. V there is shown a further modification wherein instead of forming the angled edges 6 substantially parallel with each other the said edges are tapered in opposite directions. This arrangement also provides means for varying the intensity of the strip 5 along its longitudinal edges. It is apparent that although the lens constructions shown in Figures IV and V are shown as having substantially flat parallel surfaces 11 and 12 the said surfaces may be formed with curved optical surfaces of the required radius to produce the prescriptive power desired through the finished lens, in a manner similar to that of the lens shown in Fig. VI.

In Figures VII and VIII there is shown another modified form of the invention wherein the lower portion 9 is provided with a recess or countersink 14 having a segment 15 of lens medium of a different index of refraction than said portion 9 fused or otherwise secured therein. It is to be understood that in this instance the surface 13 is formed only after the portion 15 has been secured in the recess 14. Attention is directed to the fact that the upper edge 16 of the portion 15 is cut away in a direction transversely of the lens so as to avoid interfering with the transversely extending strip 5 and also to provide a wide entrance area for the eye when passing from one focal field into the other. The transversely extending upper edge 16 in this instance lies above the optical center 17 of the lower reading portion of the lens a distance substantially equal to half of the diameter of the pupil of the eye so as to be clear of the pupil when the said pupil lies in the vicinity of said optical center 17. The optical center 18 of the major portion of the lens is in this instance above the dividing line 16 a distance substantially equal to half of the diameter of the pupil of the eye so as to lie in the vicinity of said pupil immediately upon its clearing of said dividing line 16 when passing from the reading field into the distance field of the lens. The optical center 18 in this instance is also located below the lower edge of the colored strip 5 a distance substantially equal to half the diameter of the pupil of the eye so as to obtain clear unshaded vision through the lens in the vicinity of said optical center. This of course is in instances when no glare protection is desired in this vicinity.

The strip 5 is so located with respect to the optical center 18 that when glare protection is needed a slight nod of the head brings it in line with the direct vision of the eyes. This method of shielding the eyes does not obstruct their general vision.

Attention is directed to the fact that the dividing line 16 is so located relative to the optical center 17 that there will be substantially no prismatic displacement when the eye passes into the reading field. Due to the fact that the glare protection strip or portion 5 is of substantially the same index of refraction as the portions 8 and 9 there will be no prismatic displacement when the eye passes in and out of the glare protection area.

It is also apparent that although applicant has shown the colored strip 5 as being substantially straight transversely of the lens, the said strip may be curved upwardly or downwardly or made to any shape desired. This also applies to the transverse edge 16 of the reading field of the lens. It is apparent that the edge 16 may be curved upwardly, or downwardly or made straight as desired.

It is also apparent that although applicant has shown and described the optical centers 17 and 18 as being respectively below and above the dividing line 16 the said centers may both be placed on said dividing line or each above or below as desired, depending upon the nature and requirements of the lens.

It is also apparent that if desired the lower focal field or reading portion 15 of the lens may be provided with a colored strip adjacent the top thereof, as indicated at 19 in Fig. VII, it being simply necessary in this instance to secure a strip of colored medium edge to edge with the minor portion 15 prior to securing said minor portion in the recess or countersink 14. In this instance the strip 19 would preferably be formed of glass of the same or of substantially the same index as the glass of the segment or reading portion of the lens. If a different focal field should be desired, the strip 19 could be formed of a different index of refraction. This also applies to the strip 5.

Attention is directed to the fact that the curve of the countersink 14 is such as to produce the required power through the finished reading portion of the lens.

From the foregoing description it will be seen that simple, efficient and economical means and process have been provided for accomplishing all of the objects and advantages of the invention.

Having described my invention I claim:

1. A glare protection mounting comprising lens supporting means and a pair of lenses held by said supporting means, each of said lenses being formed of a clear glass having a relatively narrow transversely extending strip of glare reducing medium secured thereto, said medium having its opposed longitudinal edges tapered and angled with respect to the plane of the lens to vary the density of said edges in the direction of the line of sight through the lens, said relatively narrow strips of glare reducing medium being located above the center or line of straight ahead vision through the lens and being adapted to be moved into and out of the line of sight of the eyes by tilting the head, the said tapered edges forming a gradual blend of the clear glass portions into the glare reducing medium along the opposed longitudinal edges of said medium.

2. A glare protection lens comprising separate pieces of clear lens medium secured edge to edge with a relatively long and narrow strip of glare reducing medium, said relatively long and narrow strip extending transversely of the lens when held in its position of use and having its opposed longitudinal edges oppositely tapered to vary the density of said edges in the direction of the line of sight through said lens.

3. A glare protection lens comprising separate pieces of clear transparent lens medium secured edge to edge with a relatively long and narrow strip of glare reducing medium, said strip extending transversely of the lens when held in its position of use and having substantially parallel edges lying at an acute angle to the plane of the lens and to the line of sight of straight ahead vision through the lens, and continuous optical surfaces on the opposite faces of said lens lying substantially in parallel relation with each other.

4. A glare protection lens comprising a plurality of pieces of clear transparent lens medium secured edge to edge with a relatively long and narrow strip of glare reducing medium, the opposed inter-engaging longitudinal edges being tapered and angled with respect to the plane of the lens to vary the density of said glare reducing medium along its longitudinal edges.

5. A glare protection lens comprising separate pieces of lens medium secured edge to edge with a relatively long and narrow strip of glare reducing medium of a different density than their lens medium, said relatively long and narrow strip extending transversely of the lens when held in its position of use and having at least one of its longitudinal edges tapered to vary the density of the said edge in the direction of the line of sight through the lens, said relatively narrow strip of glare reducing medium being located to one side of the center or line of straight ahead vision through the lens and being adapted to be moved into and out of the line of sight of the eyes by movement of the head.

6. A glare protection lens formed of relatively clear glass having a relatively narrow transversely extending strip of glare reducing medium secured thereto, said medium being of substantially the same index of refraction as the clear glass and having its opposed longitudinal edges tapered and angled with respect to the plane of the lens to vary the density of said edges in the direction of the line of sight through the lens, said relatively narrow strip of glare reducing medium being located to one side of the center or line of straight ahead vision through the lens and being adapted to be moved into and out of the line of sight of the eyes by movement of the head, the said tapered edges forming a gradual blend of the clear glass portions into the glare reducing medium along the opposed longitudinal edges of said medium.

FAY D. KINNEY.